T. W. CASE.
WIRELESS RECEIVER.
APPLICATION FILED FEB. 20, 1918.
1,379,167.
Patented May 24, 1921.
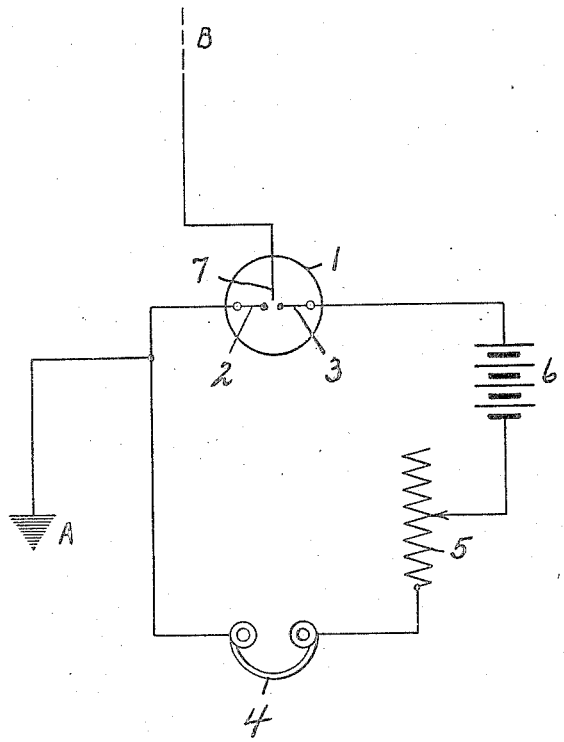

UNITED STATES PATENT OFFICE.

THEODORE WILLARD CASE, OF SCIPIO, NEW YORK.

WIRELESS RECEIVER.

1,379,167.  Specification of Letters Patent.  Patented May 24, 1921.

Application filed February 20, 1918. Serial No. 218,309.

*To all whom it may concern:*

Be it known that I, THEODORE W. CASE, a citizen of the United States of America, and resident of Scipio, in the county of Cayuga, in the State of New York, have invented new and useful Improvements in Wireless Receivers, of which the following, taken in connection with the accompanying drawings, is a full, clear, and exact description.

This invention relates to certain improvements in wireless receivers.

The primary object of the invention is to provide means for detecting feeble electrical currents or oscillations preferably by utilizing such currents or oscillations to vary a local circuit in such a manner that a vigorous response or signal results from such variation.

Primarily the invention does not involve an amplification of received oscillations and the rectification of an alternating current and the translation of such amplified, rectified current into signals but rather utilizes the received oscillations to vary the conductivity of the gas between two spaced electrodes connected in a suitable circuit containing a potential and a high resistance, so correlated with the other factors existing in the circuit that a current discharge takes place between the two spaced electrodes at regular periodic intervals producing a pulsating current of a desired frequency.

Preferably this local circuit has its factors so correlated that it oscillates at a frequency just above or just below a frequency that would produce an audible note in the receivers. The result is that any slight change of a circuit so oscillating effected as for instance by the reception of wireless waves by a member positioned adjacent the spaced electrodes of said circuit and adapted to vary the conductivity of the gas between the electrodes, will vary the frequency of oscillation of said current and raise or lower the same to an audible frequency producing a relatively loud signal in the receivers.

This is not an amplification of a received current and the rectification of an alternating current by a unilateral device but rather is the utilization of a received current to vary a local current, which preferably, normally pulsates at an inaudible frequency, the produced variation being of such a character that the frequency of pulsation is varied to bring the rate to an audible frequency resulting in the production of a note in the receivers. The indicating device as the receivers may be quiet except when the current is affected by received wireless oscillations, under which latter condition a vigorous response is produced in the receivers.

In the drawings—

The figure diagrammatically illustrates my receiving apparatus.

The vessel or bulb —1— may be filled with a suitable gas such as argon, neon or helium, such gases having a dielectric constant considerably less than that of air permitting the use of low voltage in the local circuit. This vessel contains two spaced electrodes —2— and —3— respectively. These electrodes may take the form of plates, points, balls or the like and the spaced distance of the electrodes may be regulated in accordance with conditions hereinafter prescribed. The translating apparatus may take the form of receivers —4— connected in series with an adjustable or variable high resistance —5— and a potential as battery —6— across the terminals of the electrodes —2— and —2 -. The electrode —2— may be connected to the earth as at —A—.

The resistance —5— may be a suitable mechanically variable resistance or may be a light reactive substance of suitable character or any other resistance adapted to the conditions herein described. The potential and the resistance should be so regulated and related to the conditions existing in bulb —1—, including the form and spaced distance of the electrodes, the gas contained by the bulb and the condition of vacuum, partial vacuum or atmospheric pressure, that potential will build up on one of the electrodes as —2— and discharge therefrom to the electrode —3— at a rate producing pulsations in the circuit of a frequency desired, preferably just above or just below an audible frequency. The aerial —B— for receiving wireless oscillations is connected to a third electrode —7— so positioned within vessel —1— that oscillations received by the aerial will affect the gas between the electrodes —2— and —3— varying its conductivity and thereby vary the frequency of oscillations of the current in said circuit so as to bring the same into an audible frequency producing a note in the receivers —4—.

The resistance is indicated as a mechanically variable one so that proper regulation of the factors in the circuit may be had to produce the desired frequency of oscillation. The potential may likewise be regulatable for the same purpose as by adding or subtracting cells in any suitable and well known manner.

Although I have illustrated one relation and arrangement of parts as perhaps preferable and specific constructions of distinct portions of the apparatus all as perhaps preferable, it will be readily apparent that the same are purely illustrative and that various change and modifications may be made without departing from the spirit of this invention as set forth in the appended claims.

What I claim is:

1. A wireless receiver comprising a bulb containing a pair of spaced electrodes and a gas of low di-electric constant, a local circuit connecting the terminals of said electrodes and containing a source of potential, and a translating device, and a third electrode in said bulb, and an aerial directly connected with said electrode.

2. A wireless receiver comprising a normally pulsating current circuit, including a pair of cold spaced electrodes and a translating device, a bulb inclosing said electrodes and containing a gas of low di-electric constant, an aerial, and a third electrode directly connected to said aerial and positioned adjacent the two spaced electrodes.

3. A wireless receiver comprising a pair of spaced electrodes, a source of potential and a device for translating current pulsations into audible signals, all connected in circuit and so related that the current flowing in said circuit pulsates at an audible frequency or a frequency bordering on audibility, an aerial and a third electrode directly connected to the aerial and positioned adjacent the two first-named electrodes, so that received oscillations vary the resistance of said circuit and thereby effect variations in the frequency of pulsations of the current flowing in said circuit.

In witness whereof I have hereunto set my hand this 2nd day of February, 1918.

THEODORE WILLARD CASE.

Witnesses:
EARL I. SPONABLE,
BLUI S. CUSHMAN.